United States Patent
Ito

(10) Patent No.: US 8,199,373 B2
(45) Date of Patent: Jun. 12, 2012

(54) IMAGE SCANNING APPARATUS

(75) Inventor: Tomoya Ito, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 616 days.

(21) Appl. No.: 12/412,668

(22) Filed: Mar. 27, 2009

(65) Prior Publication Data

US 2009/0244659 A1 Oct. 1, 2009

(30) Foreign Application Priority Data

Mar. 31, 2008 (JP) ................................. 2008-091454

(51) Int. Cl.
*H04N 1/04* (2006.01)

(52) U.S. Cl. .......................... 358/474; 358/498; 358/486

(58) Field of Classification Search .................. 358/474, 358/498, 497, 496, 486, 488
See application file for complete search history.

(56) References Cited

U.S. PATENT DOCUMENTS

| | | | | |
|---|---|---|---|---|
| 5,239,395 A * | 8/1993 | Kang et al. | ..................... | 358/498 |
| 6,038,424 A * | 3/2000 | Nakagawa | ..................... | 399/367 |
| 6,453,080 B1 * | 9/2002 | Kao | ............... | 382/312 |
| 6,493,113 B1 * | 12/2002 | Fujii et al. | ..................... | 358/488 |
| 6,999,209 B2 * | 2/2006 | Kelly et al. | ..................... | 358/474 |
| 7,016,090 B2 * | 3/2006 | Sekine | .......................... | 358/498 |
| 7,548,353 B2 * | 6/2009 | Kakutani | ....................... | 358/487 |
| 7,652,777 B2 * | 1/2010 | Enomoto | .................... | 358/1.12 |
| 7,813,010 B2 * | 10/2010 | Michiie et al. | ................. | 358/474 |
| 8,072,652 B2 * | 12/2011 | Yamada | ......................... | 358/474 |
| 2002/0044305 A1 * | 4/2002 | Kawai et al. | .................. | 358/474 |
| 2004/0240001 A1 * | 12/2004 | Tehrani et al. | ................. | 358/488 |
| 2008/0123163 A1 * | 5/2008 | Nakano et al. | ................. | 358/498 |

FOREIGN PATENT DOCUMENTS

| | | |
|---|---|---|
| JP | 05-110743 | 4/1993 |
| JP | 05110757 | 4/1993 |
| JP | 08-152813 | 6/1996 |
| JP | 11-194676 | 7/1999 |
| JP | 2004-233557 | 8/2004 |
| JP | 2005-051402 | 2/2005 |
| JP | 2005-136656 | 5/2005 |
| JP | 2006-162714 | 6/2006 |
| JP | 2006229896 | 8/2006 |

OTHER PUBLICATIONS

Notification of Reasons for Refusal for Japanese patent application No. 2008-091454 mailed Jul. 28, 2011.

* cited by examiner

*Primary Examiner* — Negussie Worku
(74) *Attorney, Agent, or Firm* — Banner & Witcoff, Ltd.

(57) ABSTRACT

An image scanning apparatus including an open-close detector configured to detect an open-close state of a document cover, a first document-detector, a scanning unit configured to scan a document placed on a platen or a document fed from a document tray, a control unit, and a commanding unit configured to input a start command to start scanning. When the start command is inputted, when the document placed on the document tray is detected by the first document-detector, the control unit controls the scanning unit to scan the document fed from the document tray, and when the document placed on the document tray is not detected, the control unit determines whether to execute scanning of the document placed on the platen. The determination is performed based on a result of detection performed by the open-close detector.

11 Claims, 16 Drawing Sheets

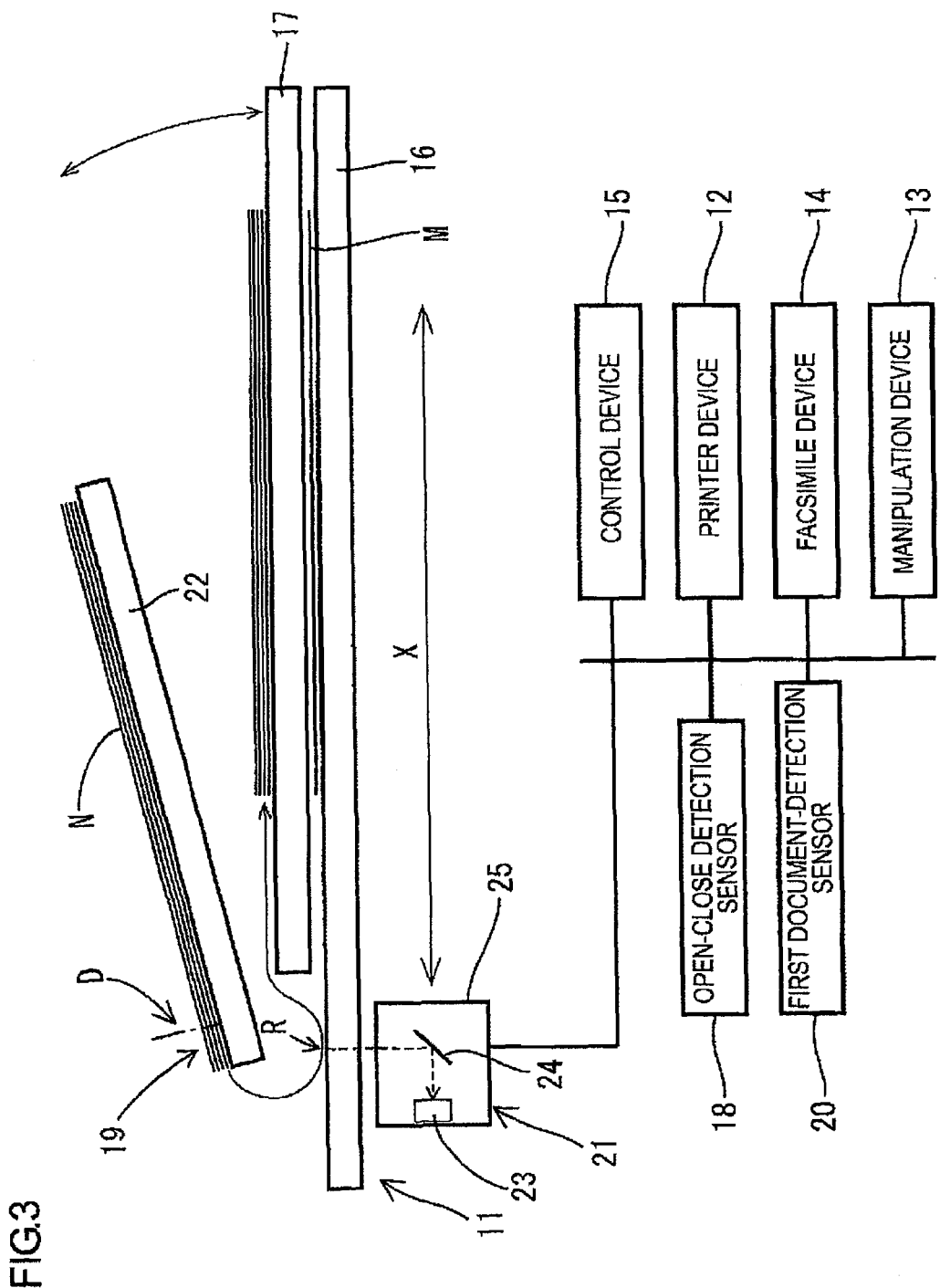

FIG.4

| DOCUMENT EXISTS | NO DOCUMENT EXISTS | | | | | | |
|---|---|---|---|---|---|---|---|
| | TIME PERIOD FROM TERMINATION OF PREVIOUS SCANNING PROCESSING TO PRESENT START COMMAND IS EQUAL TO OR LESS THAN 1 MIN. (THIRD TIME PERIOD) | | TIME PERIOD FROM TERMINATION OF PREVIOUS SCANNING PROCESSING TO PRESENT START COMMAND IS GREATER THAN 1 MIN. (THIRD TIME PERIOD) | | | | |
| | RE-COPY IS SELECTED BY THE USER | RE-COPY IS NOT SELECTED BY THE USER | PRESENT DOCUMENT COVER IS IN OPEN STATE | PRESENT DOCUMENT COVER IS IN CLOSED STATE | | | |
| | | | | OPEN STATE OF DOCUMENT COVER DETECTED DURING TIME PERIOD FROM PREVIOUS PROCESSING TO PRESENT PROCESSING | | | OPEN STATE OF DOCUMENT COVER UNDETECTED DURING TIME PERIOD FROM PREVIOUS PROCESSING TO PRESENT PROCESSING |
| | | | | DOCUMENT COVER SHIFTED FROM OPEN STATE TO CLOSED STATE DURING 1 MIN. (FIRST TIME PERIOD) PRIOR TO PRESENT START COMMAND | | DOCUMENT COVER NOT SHIFTED FROM OPEN STATE TO CLOSED STATE DURING 1 MIN. (FIRST TIME PERIOD) PRIOR TO PRESENT START COMMAND | |
| | | | | OPEN STATE DURATION IS EQUAL TO OR GREATER THAN 5 SEC. | OPEN STATE DURATION IS LESS THAN 5 SEC. | | |
| COPY EXECUTED | RE-PRINTED | COPY NOT EXECUTED | COPY EXECUTED | COPY EXECUTED | COPY NOT EXECUTED | COPY NOT EXECUTED | COPY NOT EXECUTED |

IMAGE SCANNING APPARATUS

CROSS REFERENCE TO RELATED APPLICATION

This application claims priority from Japanese Patent Application No. 2008-091454 filed on Mar. 31 2008. The entire content of this priority application is incorporated herein by reference.

TECHNICAL FIELD

The present invention relates to an image scanning apparatus.

BACKGROUND

A known image forming apparatus includes a document table and an automatic document feeder (ADF). The document table holds a document thereon. The ADF feeds a document placed on a document tray thereof to a scanning position. The image forming apparatus scans the document on the document table or the document fed to the scanning position by the ADF.

The image forming apparatus, which scans the document on the document table or the document fed to the scanning position by the ADF, also includes a sensor for detecting the document placed on the document tray. However, with the image forming apparatus, if the document is not accurately placed on the document tray of the ADF while a user is causing the ADF to feed the document to scan the document, the sensor can fail to detect the document and cause a determination that no document is placed on the ADF. In this event, instead of the document placed on the document tray of the ADF, the image forming apparatus scans the document left on the document table or, in a case where no document is placed thereon, scans a document cover covering the document table.

Therefore, there is a need for the image scanning apparatus to reduce accidental scanning of the document on the document table when the document is inaccurately placed on the document tray of the document feeder.

SUMMARY

An aspect in accordance with the present invention is an image scanning apparatus including a platen configured to support a document placed thereon, a document cover configured to shift between an open state to open the platen and a closed state to close the platen, the document cover including a document feeder having a document tray. The document tray is configured to support a document placed thereon. The document feeder is configured to feed the document placed on the document tray to a scanning position. The image scanning apparatus includes also an open-close detector configured to detect the state of the document cover, a first document-detector configured to detect the document placed on the document tray, a scanning unit configured to selectively scan the document placed on the platen and the document at the scanning position fed from the document tray and generate image data, a control unit configured to control at least one of the document feeder and the scanning unit and to cause the scanning unit to selectively scan the document placed on the platen and the document fed from the document tray, and a commanding unit configured to input a start command to start scanning. When the start command is inputted, when the document placed on the document tray is detected by the first document-detector, the control unit controls the scanning unit to scan the document fed from the document tray, and when the document placed on the document tray is not detected by the first document-detector, the control unit performs determines whether to execute scanning of the document placed on the platen. The determination is performed based on a result of detection performed by the open-close detector.

A case of scanning the document fed from the document tray and a case of scanning the document placed on the platen are different in result of detection performed by the open-close detector.

Accordingly, accidental scanning of the document placed on the platen when the document is inaccurately placed on the document tray of the document feeder can be reduced in the following manner: in the case where the document placed on the document tray is not detected, it is determined based on result of detection performed by the open-close detector whether the user has an intention of scanning the document placed on the platen; in the case where the user has no intention of scanning the document placed on the platen, execution of scanning of the document placed on the platen is cancelled.

With this aspect in accordance with the present invention, it is determined based on the result of detection performed by the open-close detector whether to execute scanning of the document placed on the platen. This serves to reduce accidental scanning of the document placed on the platen when the document is inaccurately placed on the document tray of the document feeder.

BRIEF DESCRIPTION OF THE DRAWINGS

FIG. 3 is a diagrammatic view of the multi-function machine of the first illustrative aspect in accordance with the present invention;

FIG. 4 is a table schematically showing a process of the first illustrative aspect in accordance with the present invention;

DETAILED DESCRIPTION

<First Illustrative Aspect>

A first illustrative aspect will be described with reference to FIGS. 1 through 10.

(Exterior of Multi-Function Machine)

Figure 1:
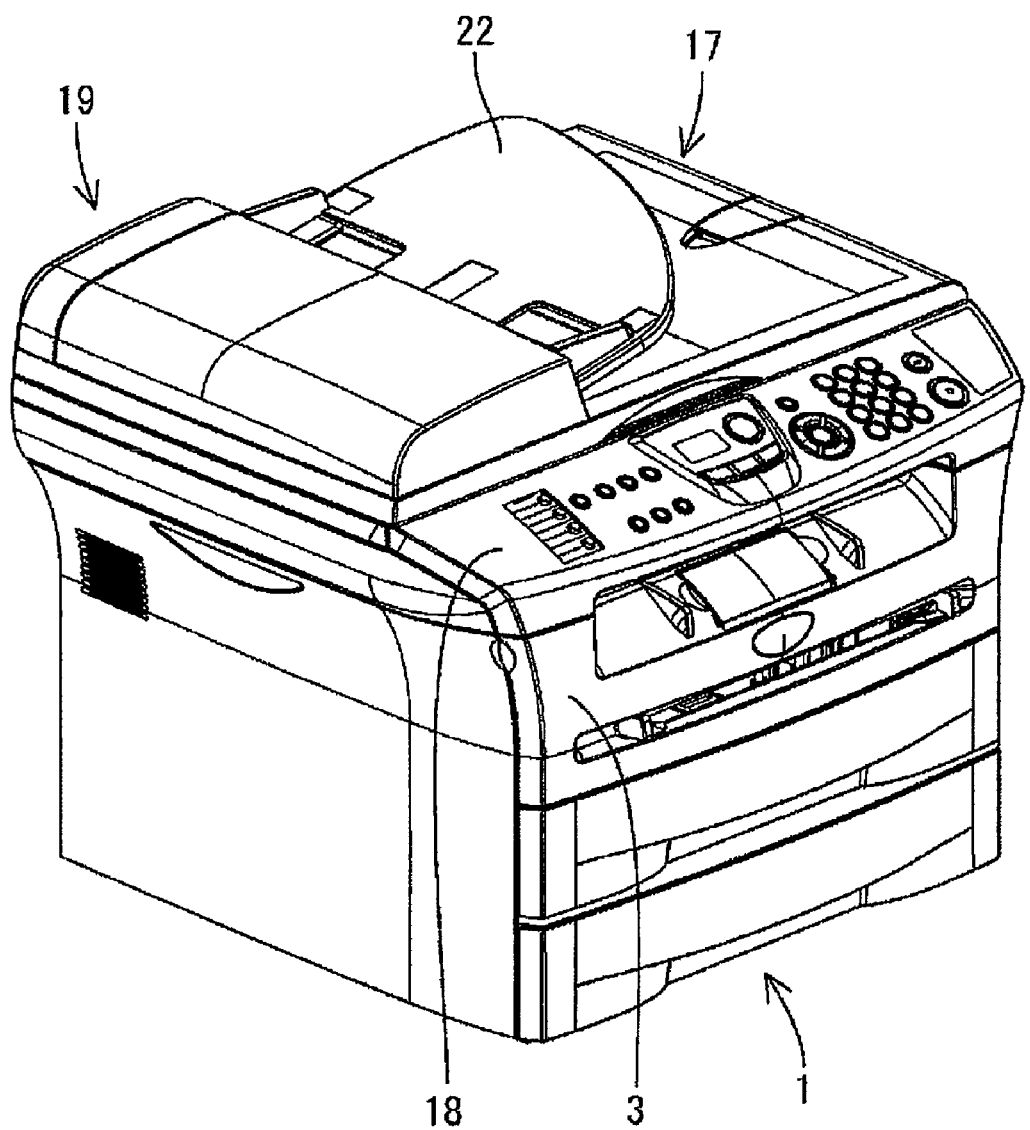
FIG. 1 is a partial perspective view of a multi-function machine of a first illustrative aspect in accordance with the present invention.
Figure 2:
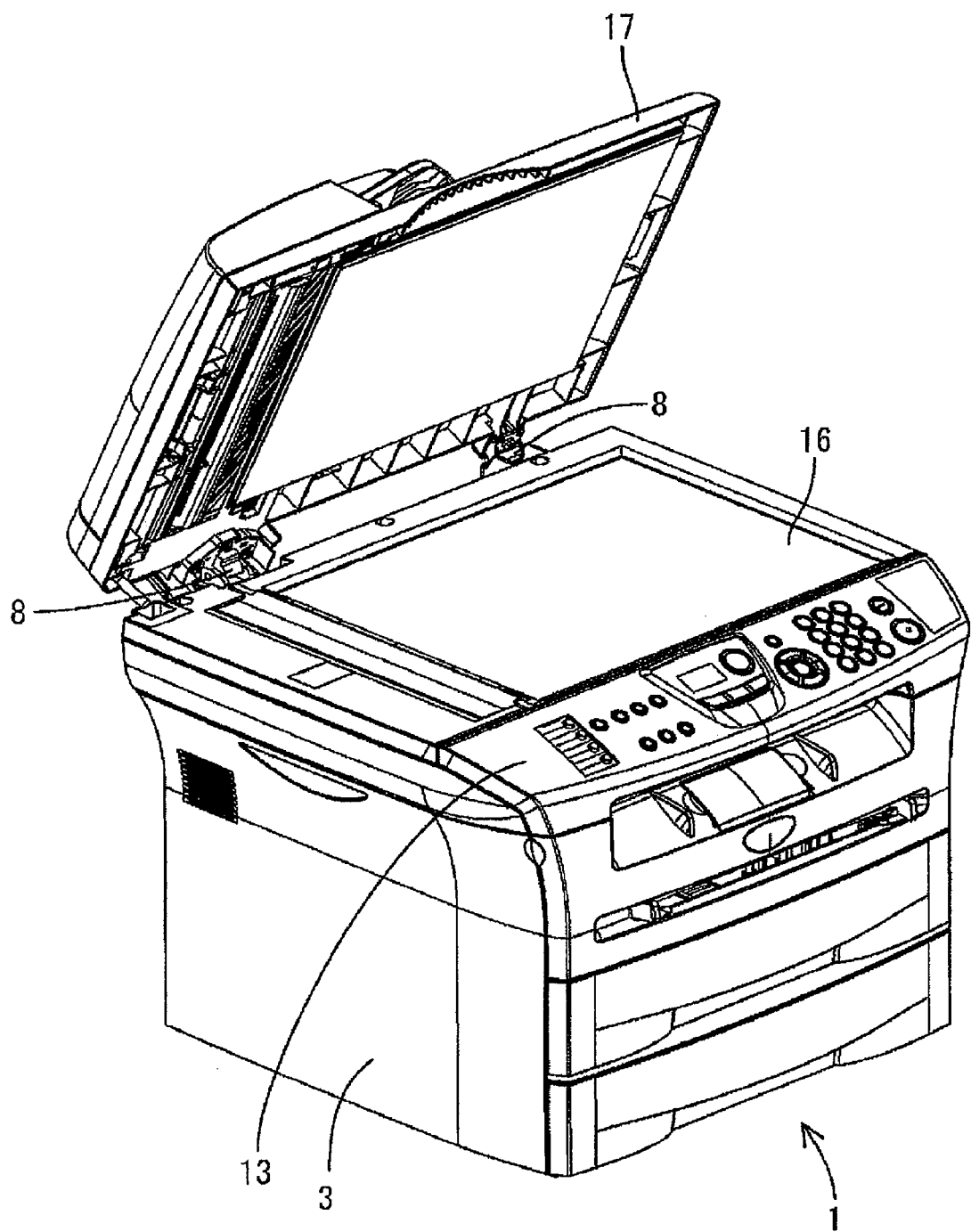
FIG. 2 is another partial perspective view of the multi-function machine of the first illustrative aspect in accordance with the present invention.

FIGS. 1 and 2 are perspective views partially showing an exterior of a multi-function machine 1 (an illustration of an image scanning apparatus) including a scanner function, a printer function, a copy function, and a facsimile function.

The multi-function machine 1 includes a body casing 3. The body casing 3 is provided with a platen 16 horizontally secured to a top face thereof. The platen 16 is made of transparent glass on which a document is placed. The body casing 3 is also provided with a manipulation device 13 disposed on a top-front face thereof. The manipulation device 13 includes a liquid crystal panel and button switches for inputting settings and commands. A document cover 17 is connected to a rear edge of the top face of the body casing 3 via hinges 8 so as to turn up and down. An automatic document feeder (ADF) 19 (an illustration of a document feeder) is provided on a side of a top face of the document cover 17. The ADF 19 has a document tray 22.

(Schematic Configuration of Multi-Function Machine)

FIG. 3 is a diagrammatic view schematically showing a configuration of the multi-function machine 1.

The multi-function machine 1 includes a scanner device 11 for scanning documents, a printer device 12 (an illustration of an output unit) for forming images on recording media such as sheets of paper, the manipulation device 13, a facsimile device 14 (an illustration of an output unit), and a control device 15 (an illustration of a control unit).

The scanner device 11 is a so-called flatbed image scanner. The scanner device 11 is configured by the platen 16, the document cover 17, an open-close detection sensor 18 (an illustration of an open-close detector), the ADF 19, a first document-detection sensor 20 (an illustration of a first document-detector), a scanning assembly 21 (an illustration of a scanning unit), and the like. The document cover 17 shifts between an open state to open the platen 16 and a closed state to close the platen 16. The open-close detection sensor 18 detects the open-close state of the document cover 17. The ADF 19 feeds a document placed on the document tray 22 to a scanning position R. The first document-detection sensor 20 detects the document placed on the document tray 22. The scanning assembly 21 scans a document placed on the platen 16 or a document fed to the scanning position R by the ADF 19 and generates image data. Note that, hereinafter, a document placed on the platen 16 will be referred to as an "on-platen document M", while a document placed on the document tray 22 and fed to the scanning position R by the ADF 19 will be referred to as an "on-tray document N".

The open-close detection sensor 18 is a switch that, for example, switches on when the document cover 17 is in the closed state while switches off when the document cover 17 is in the open state. When the document cover 17 is in the closed state, the open-close detection sensor 18 outputs an ON signal while, when the document cover 17 is in the open state, outputs an OFF signal.

The ADF 19 is configured by the document tray 22 on which a document is placed, a plurality of rollers (not illustrated), a driving motor (not illustrated) whereby these plurality of rollers are rotationally driven, and the like. The ADF 19 separates and feeds on-tray documents N one by one to the scanning position R. The on-tray document N, while being delivered on the scanning position R, is scanned by the scanning assembly 21. Thereafter, the on-tray document N is ejected onto the document cover 17.

The first document-detection sensor 20 is a switch that, for example, switches on when the document N is placed on the document tray 22 and is inserted in a detection position D while switches off when no on-tray document N exists in the detection position D. When the on-tray document N exists in the detection position D, the first document-detection sensor 20 outputs an ON signal to the control device 15. When no on-tray document N exists in the detecting position D, the first document-detection sensor 20 outputs an OFF signal.

The scanning assembly 21 includes a line sensor 23 such as a CIS (contact image sensor), a light source (not illustrated), an optical system 24, a carriage 25, a carrying mechanism (not illustrated), an image processing device (not illustrated), and the like. The line sensor 23 extends in a main scanning direction. The light source irradiates the on-tray document N or the on-platen document M. Light reflected by the on-platen document M or by the on-tray document N enters the line sensor 23 via the optical system 24. The line sensor 23 and the light source are mounted on the carriage 25. The carrying mechanism carries the carriage 25 in a sub scanning direction (X direction) that is perpendicular to the main scanning direction. The image processing device converts an analogue sensor output outputted from the line sensor 23 into a digital signal, performs given image processing such as shading correction and gamma correction, and thus generates image data.

When scanning the on-platen document M, the scanning assembly 21 performs scanning while carrying the line sensor 23 in the sub scanning direction using the carrying mechanism. On the other hand, when scanning the on-tray document N, the scanning assembly 21 performs scanning while holding the line sensor 23 in a regular place below the scanning position R.

The printer device 12 has a conveying mechanism for conveying a recording medium, such as a sheet of paper, from a sheet-supply tray. Based on the image data generated in the scanner device 11 or image data received in the facsimile device 14, the printer device 12 forms (prints) an image on the recording medium by laser or by inkjet. Thus, output of the image data is performed.

The manipulation device 13 (an illustration of a selecting unit) is configured by a plurality of button switches (an illustration of a commanding unit) such as a copy button, a display device such as a liquid crystal display, and the like. Using the button switches, the user can input a start command for copying, which will be described below. The user inputs settings and commands by pressing the button switches while viewing a window displayed on the display device.

The facsimile device 14 performs facsimile transmission and reception of image data between other facsimile devices via phone lines.

The control device 15 is configured by a CPU, a ROM, a RAM (an illustration of a storage unit), and a clock unit. The control device 15 executes programs stored in the ROM to control each device of the multi-function machine 1. Specifically, for example, the control device 15 executes copying (an illustration of scanning and outputting), facsimile transmission (an illustration of the outputting), and the like. In the copying, the control device 15 controls the ADF 19 and the scanning assembly 21 to scan the on-platen document M or the on-tray document N and generate the image data and, further, controls the printer device 12 to print the image data. In the facsimile transmission, the control device 15 controls the facsimile device 14 to fax the image data.

(Outline of Process performed by Multi-Function Machine)

An outline of process performed by the multi-function machine 1 will be described by illustrating the copying, which is started when the copy button of the manipulation device 13 is pressed by the user.

As shown in FIG. 4, the copying is divided into two cases that differ from each other. One of the two cases is a case where the on-tray document N is detected by the first document-detection sensor 20 (a case where it is determined that the document N exists on the document tray 22 of the ADF 19). The other case is a case where no document N is detected by the first document-detection sensor 20 (a case where it is determined that no document N exists on the document tray 22 of the ADF 19).

First, a process in the case where the document N exists on the document tray 22 of the ADF 19 will be described. In the case where the on-tray document N exists on the document tray 22 of the ADF 19, the on-tray document N is scanned, image data of the document N is generated, and the image data is printed.

Next, a process in the case where no document N exists on the document tray 22 of the ADF 19 will be described.

In this case, the process is divided into two cases based on whether a time period from a time point where the previous scanning is terminated to a time point where a start command for the present scanning (hereinafter referred to as the present start command) is inputted is equal to or less than 1 minute (an illustration of a third time period).

In the case where the time period from the time point where the previous scanning is terminated to the time point where the present start command is inputted is equal to or less than 1 minute, there is a possibility that the identical document scanned in the previous scanning is being re-copied. If the identical document is being re-copied, it is only necessary to re-print the image data generated in the previous scanning; it is unnecessary to re-execute scanning related to the identical document. Accordingly, the multi-function machine 1 stores the generated image data and, in the case where the time period from the time point where the previous scanning is terminated to the time point where the present start command is inputted is equal to or less than 1 minute, the multi-function machine 1 asks the user whether to re-copy. In a case where the user selects to re-copy, the image data generated at the previous scanning (hereinafter referred to as the previously generated image data) is re-printed. Thus, in the case of re-copying, higher performance can be obtained by omitting scanning.

On the other hand, in this illustrative aspect, in a case where the user does not select to re-copy, the multi-function machine 1 executes nothing and terminates the process. Note here that, in the case where the user does not select to re-copy, the multi-function machine 1 may execute copying by scanning and then printing the on-platen document M.

In the case where the time period from the time point where the previous start command is inputted to the time point where the present start command is inputted is greater than 1 minute (an illustration of the third time period), the process is divided into two cases based on whether the present document cover 17 is in the open state.

In the case where the state of the present document cover 17 is the open state, the on-platen document M is copied. Here, when setting the document N on the document tray 22 of the ADF 19 and causing it to be scanned, the user usually closes the document cover 17. Accordingly, in the case where the document cover 17 is open, there is less possibility that the on-tray document N is being scanned; rather, when the document cover 17 is open, it is more possible that the on-platen document M having a greater thickness (such as a book) is being scanned. Therefore, in this illustrative aspect, when the state of the present document cover 17 is the open state, copying of the on-platen document M is executed.

In the case where the present document cover 17 is not in the open state, i.e. is in the closed state, the process is divided into two cases based on whether the open state of the document cover 17 has been detected during the time period from a start command for the previous scanning (hereinafter referred to as the previous start command) to the present start command.

If what is being performed is not to re-copy the previously copied on-platen document M but to copy another on-platen document M, the user should put the document cover 17 into the open state and place the another on-platen document M during the time period from the previous start command to the present start command. Conversely, in the case where the open state has been undetected, the following accident is highly possible: the user is not intending to scan the on-platen document M; rather, the user is trying to scan the on-tray document N; however, the on-tray document N has been inaccurately set and thus has not been inserted in the detecting position D, resulting in failure of first document-detection sensor 20 in detecting the on-tray document N; and thus, it has been determined that no on-tray document N exists.

In this case, if the on-platen document M would be scanned and printed, the on-platen document M left on the platen 16 would have to be copied or, in a case where no on-platen document M exists, the document cover 17 covering the platen 16 would have to be scanned and a blank image would be printed. This would force the user to wait until the undesired copy would be over. Furthermore, this would cause waste of resource such as the recording media and power. Therefore, in this illustrative aspect, in the case where the open state of the document cover 17 has not been detected during the time period from the previous start command to the present start command, execution of copying of the on-platen document M is cancelled.

On the other hand, in the case where the open state of the document cover 17 has been detected during the time period from the previous start command to the present start command, the process is divided into two cases based on whether the document cover 17 has been shifted from the open state to the closed state during the time period of 1 minute (an illustration of the first time period) prior to the time point of inputting the present start command.

The time period from close of the document cover 17 to input of the start command is generally a shorter time period that is, in many cases, equal to or less than 1 minute. That is, if the user is intending to scan the on-platen document M, the state of the document cover 17 should be shifted from the open state to the closed state during the time period of 1 minute prior to the time point of inputting the present start command.

Conversely, if the state of the document cover 17 has not been shifted from the open state to the closed state during the time period of 1 minute prior to the time point of inputting the present start command, there is a higher possibility that the user, without intending to scan the on-platen document M, is trying to scan the on-tray document N but, since the on-tray document N has been inaccurately set, resulting in causing the determination that no on-tray document N exists.

Therefore, in this illustrative aspect, in the case where the document cover 17 has not been shifted from the open state to the closed state during the time period of 1 minute prior to the time point of inputting the present start command, execution of copying of the on-platen document M is cancelled. Accordingly, in the case where, for example, the open state of the document cover 17 has not been detected within 1 minute prior to the time point of inputting the start command, execution of scanning of the on-platen document M shall be cancelled.

On the other hand, in a case where the document cover 17 has been shifted from the open state to the closed state during the time period of 1 minute prior to the time point of inputting the present start command, the process is divided into two cases based on whether the duration time period of this open state is less than 5 seconds (an illustration of a second time period).

Generally, in the case of placing a document M on the platen 16, it takes 5 seconds or more from open of the document cover 17 to close of the document cover 17. Conversely, in the case where the duration time period from open of the document cover 17 to close of the document cover 17 is less than 5 seconds, there is a higher possibility that the user, without placing any on-platen document M, has only ascertained that no on-platen document M remains on the platen 16.

That is, in the case where the duration time period is less than 5 seconds, there is a higher possibility that the user, without intending to scan the on-platen document M, is trying to scan the on-tray document N, but since the on-tray document N has been inaccurately set, a determination is made that no on-tray document N exists. Accordingly, in this illustrative aspect, in the case where the duration time period of the open state is less than 5 seconds, execution of copying of the on-platen document M is cancelled.

On the other hand, in the case where the duration time period of the open state is equal to or greater than 5 seconds, there is a higher possibility that the user has placed the document M on the platen 16. That is, there is a higher possibility that the user is intending to scan the on-platen document M. Accordingly, in this illustrative aspect, in the case where the duration time period of the open state is equal to or greater than 5 seconds, copying of the on-platen document M is executed.

(Illustrative Case of Process Performed by Multi-Function Machine)

Next, some cases will be illustrated to describe relationship between the output signal of the first document-detection sensor 20, the output signal of the open-close detection sensor 18, scanning of the on-tray document N, scanning of the on-platen document M, and printing.

Figure 5:
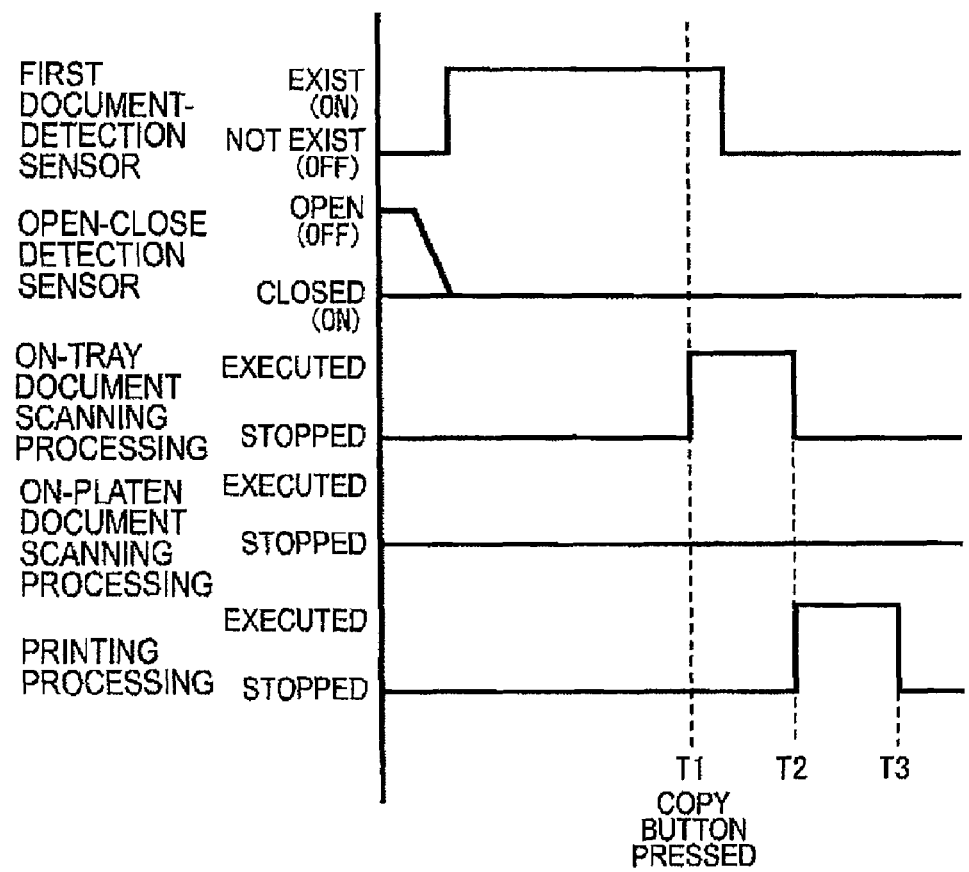
FIG. 5 is a time chart of the first illustrative aspect in accordance with the present invention.

FIG. 5 is a time chart of performing copying and re-copying of the document N placed on the document tray 22 of the ADF 19.

At a time point T1 where the copy button is pressed, the output signal of the first document-detection sensor 20 is ON (a document exists). In this case, upon pressing the copy button at the time point T1, the multi-function machine 1 executes scanning of the on-tray document N, and printing of the image data generated by the scanning. That is, the multi-function machine 1 executes copying of the on-tray document N.

Figure 6:
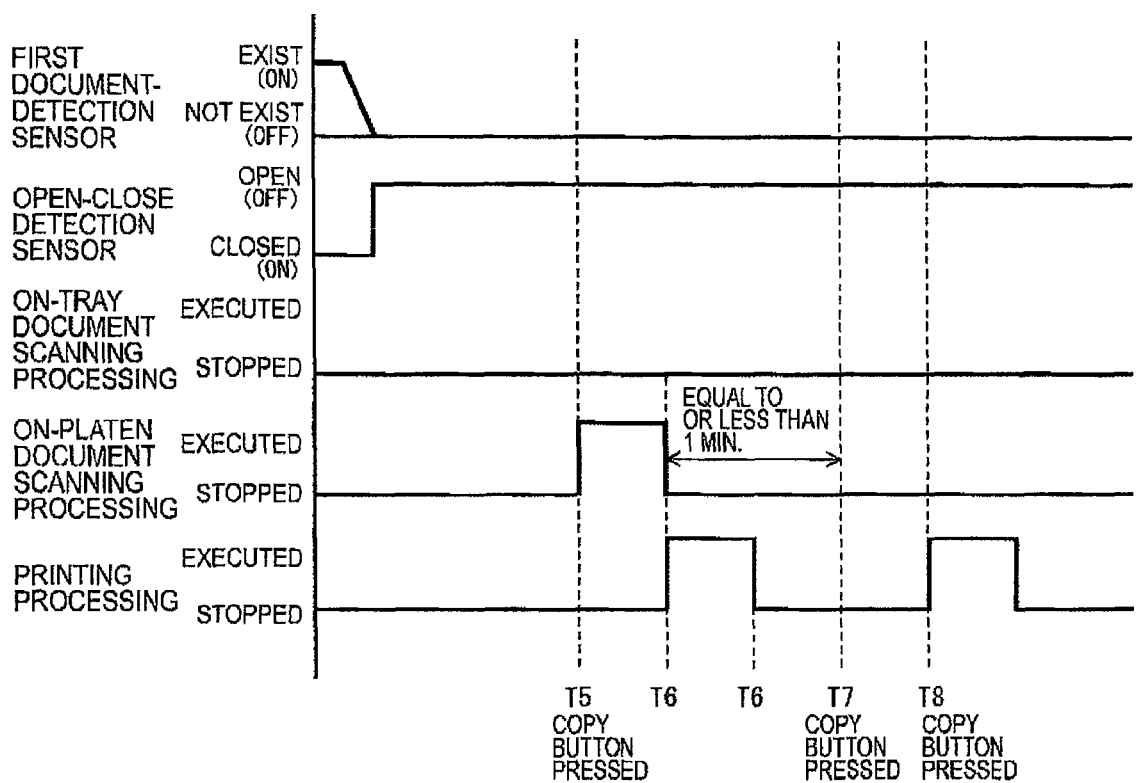
FIG. 6 is another time chart of the first illustrative aspect in accordance with the present invention.

FIG. 6 is a time chart of performing copying and re-copying a document M having a greater thickness (such as a book) on the platen 16. The time period from termination of the previous scanning to the time point T5 where the copy button is pressed is illustrated to be greater than 1 minute.

At a time point T5 where the copy button is pressed, the output signal of the first document-detection sensor 20 is OFF (no document exists), while the output signal of the open-close detection sensor 18 is OFF (the open state). In this case, the multi-function machine 1 executes scanning of the on-platen document M and, further, executes printing of the image data generated by the scanning. That is, the multi-function machine 1 executes copying of the on-platen document M.

In the illustration shown in this figure, the copy button is again pressed at a time point T7 that is after the copying is executed. The time difference between a time point T6 where the previous scanning is terminated and the time point T7 is equal to or less than 1 minute. In this case, the multi-function machine 1 determines that re-copying is desired.

Note that, while the multi-function machine 1 determines to perform re-copying, printing of the previously generated image data is performed not immediately; the multi-function machine 1 asks the user whether to perform recopying. In a case where recopying is desired, the user presses again the copy button during a predetermined time period. In the illustration shown in this figure, the copy button is pressed again at a time point T8, which is during the predetermined time period. In this case, the multi-function machine 1 does not execute scanning but performs only printing of the previously generated image data.

Note that, in this illustrative aspect, a determination of whether to perform recopying is made based on whether the time difference between the time point T6 where the previous scanning is terminated and the time point T7 is equal to or less than 1 minute. The determination of whether to perform recopying may be made using a time difference between the time point T5 where the previous start command is inputted and the time point T7 or using a time difference between a time point T6' where the previous printing is terminated and the time point T7.

Figure 7:
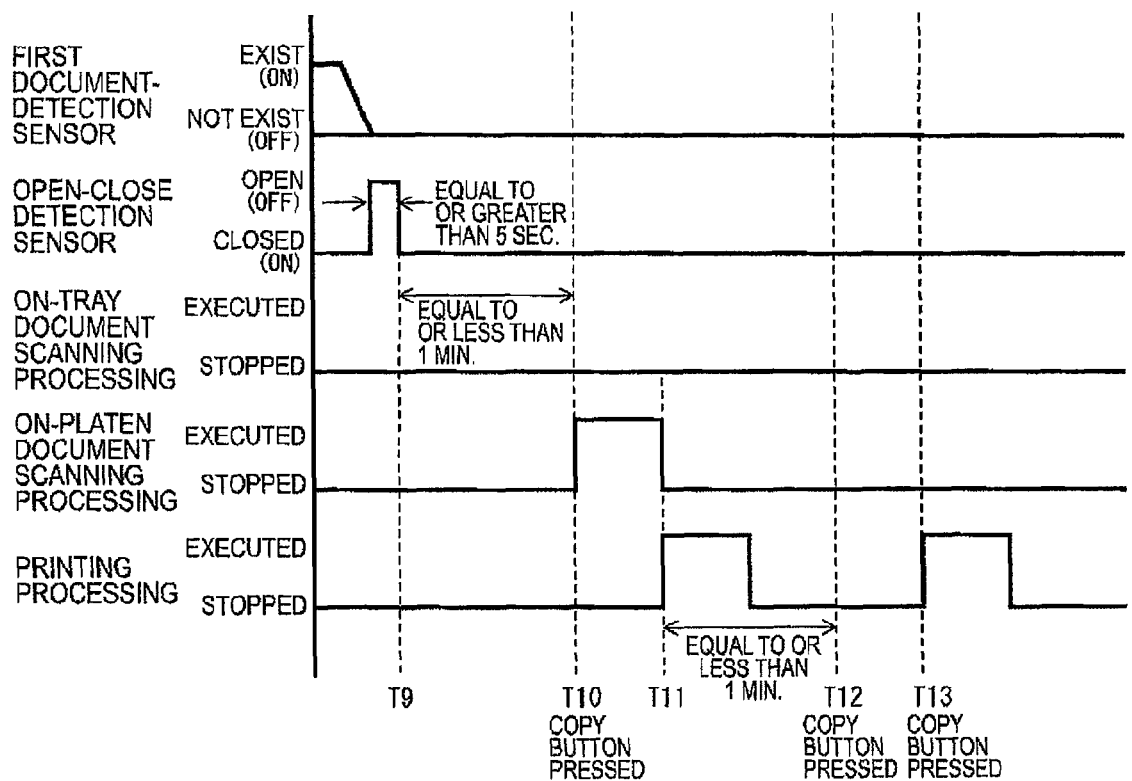
FIG. 7 is another time chart of the first illustrative aspect in accordance with the present invention.

FIG. 7 is a time chart of copying and re-copying the on-platen document M. At a time point T10 where the copy button is pressed, the output signal of the first document-detection sensor 20 is OFF (no document exists), while the output signal of the open-close detection sensor 18 is ON (the closed state). In the illustration shown in this figure, the output signal of the open-close detection sensor 18 shifts from OFF (the open state) to ON (the closed state) at a time point T9, which is a time point before the copy button is pressed at a time point T10. Then, until the output signal of the open-close detection sensor 18 shifts to ON (closed state) at the time point T9, the output signal of the open-close detection sensor 18 stays OFF (the open state) continuously for 5 seconds or more.

In this case, at the time point T10 where the copy button is pressed, the multi-function machine 1 executes scanning of the on-platen document M and, further, executes printing of the image data generated by the scanning. That is, the multi-function machine 1 executes copying of the on-platen document M.

In the illustration shown in this figure, the copy button is pressed again at a time point T12 that is after the copying is executed. A time difference between the time point T11 and the time point T12 is equal to or less than 1 minute. In this case, the multi-function machine 1 asks the user whether to perform re-copying and, in the case where the copy button is pressed again during the predetermined time period, performs printing of the previously generated image data. In the illustration shown in this figure, the copy button is pressed again at a time point T13 during the predetermined time period. In this case, the multi-function machine 1 cancels execution of scanning and performs only printing of the previously generated image data.

(Details of Process performed by Multi-Function Machine)

Next, details of process performed by the multi-function machine 1 will be described.

In this process, the multi-function machine 1 is illustrated to, upon executing the document scanning and generating the image data, store the image data in the RAM for re-copying and, upon a lapse of 1 minute after termination of the scanning, delete the stored image data.

Figure 8:
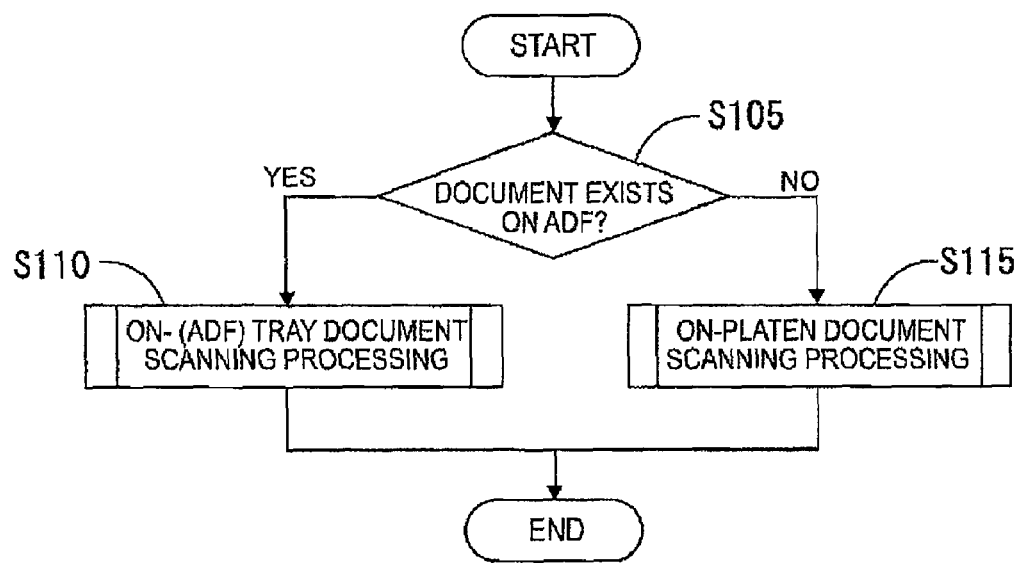
FIG. 8 is a flowchart of the first illustrative aspect in accordance with the present invention.

FIG. 8 is a flowchart showing a process of the multi-function machine 1. When the copy button of the manipulation device 13 is pressed, thereby inputting the start command, this process is started.

In S105, the control device 15 determines the state of the output signal of the first document-detection sensor 20. When the output signal is ON (a document exists), the control device 15 determines that the on-tray document N exists, and the process goes to scanning of the on-tray document N (S110). On the other hand, when the output signal is OFF (no document exists), the control device 15 determines that no on-tray document N exists, and the process goes to scanning of the on-platen document M (S115).

In S110, the control device 15 controls the ADF 19 and the scanning assembly 21 to execute scanning of the on-tray document N and prints the image data generated by the scanning.

Next, scanning of the on-platen document M (S115) will be described.

Figure 9:
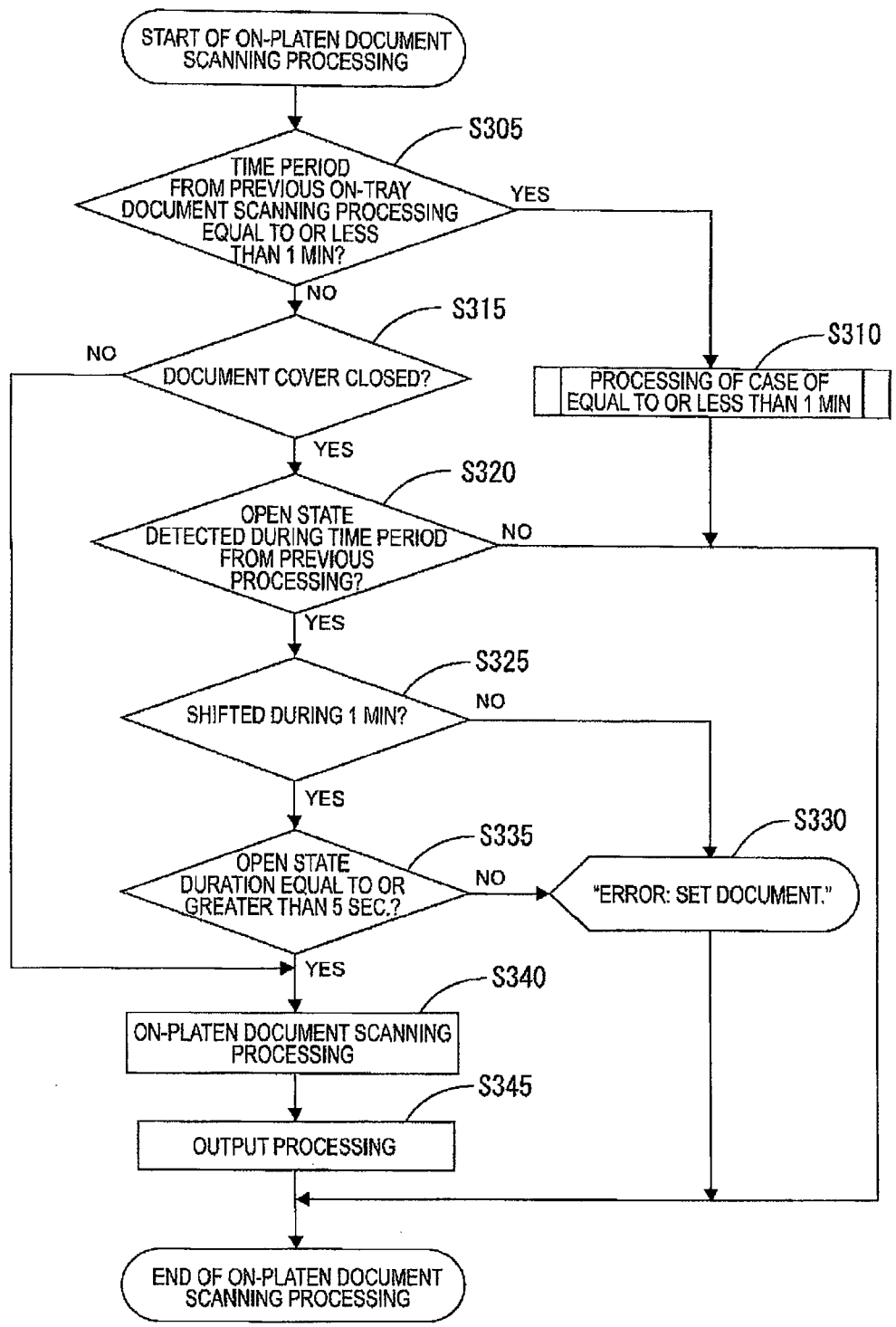
FIG. 9 is another flowchart of the first illustrative aspect in accordance with the present invention.

FIG. 9 is a flowchart showing a process of scanning of the on-platen document M.

In S305, the control device 15 determines whether a time period from termination of the previous scanning of the on-platen document M to the press of the copy button is equal to or less than 1 minute (the illustration of the third time period). In the case where the time period is equal to or less than 1 minute, the process goes to S310 to execute the processing for the case where the time period is equal to or less than 1 minute. In the case where the time period is greater than 1 minute, the process goes to S315.

In S315, the control device 15 determines whether the present document cover 17 is in the closed state. In a case where the present document cover 17 is in the closed state, the process goes to S320. When the present document cover 17 is in the open state, the process goes to S340.

In S320, the control device 15 determines whether the open state of the document cover 17 has been detected during the time period from the previous start command to the present start command. In the case where the open state has been detected, the process goes to S325. In the case where the open state has been undetected, the process is terminated.

In S325, the control device 15 determines whether the document cover 17 has been shifted from the open state to the closed state during the time period of 1 minute (the illustration of the first time period) prior to the time point where the copy button is pressed. When the document cover 17 has not been sifted from the open state to the closed state during the time period of 1 minute, the process goes to S330. When the document cover 17 has been shifted from the open state to the closed state then, the process goes to S335.

In S330, the control device 15 indicates an error message such as "Error: Set a document." or the like in the display device and terminates the process.

In S335, the control device 15 determines whether the duration time period of the open state is equal to or greater than 5 seconds. When the duration time period is equal to or greater than 5 seconds, the process goes to S340. When the duration time period is less than 5 seconds, the process goes to S330.

In S340, the control device 15 controls the scanning assembly 21 to execute scanning of the on-platen document M. The control device 15 stores image data generated by the scanning in the RAM.

In S345, the control device 15 prints the image data stored in the RAM.

Next, a process in a case where the time period, which is from termination of the previous scanning of the on-platen document M to the press of the copy button, is equal to or less than 1 minute will be described.

Figure 10:
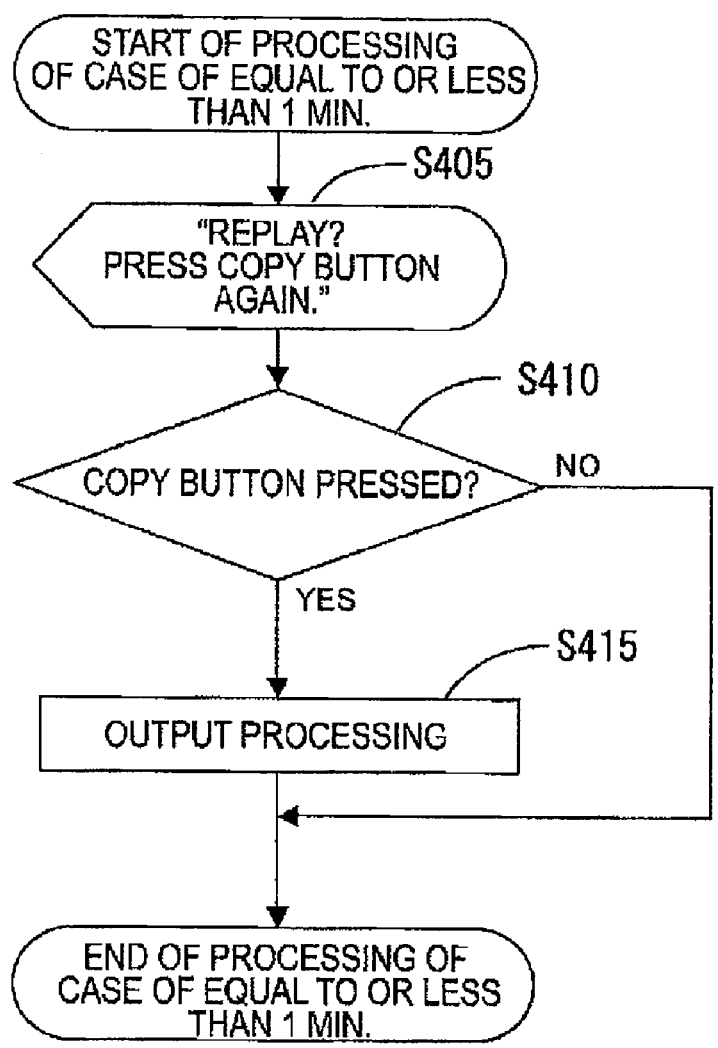
FIG. 10 is another flowchart of the first illustrative aspect in accordance with the present invention.

FIG. 10 is a flowchart showing a process (S310 in FIG. 9) in a case where the time period is equal to or less than 1 minute.

In S405, the control device 15 asks the user whether to re-print the image data generated in the previous scanning of the on-platen document M. Specifically, for example, the control device 15 indicates a message such as "REPLAY? Press the copy button again." in the display device.

In a case of printing the image data generated in the previous scanning of the on-platen document M, the user presses the copy button during the predetermined time period. On the other hand, in a case where re-printing of the previous image data is undesired, the user waits for the predetermined time period without pressing the copy button.

When the copy button is pressed during the predetermined time period, the process goes to S415. When the copy button is not pressed during the predetermined time period, the process is terminated.

In S415, the control device 15 prints the image data stored in the RAM.

With the above-described multi-function machine 1 of this illustrative aspect in accordance with the present invention, in the case where the open state of the document cover 17 has been undetected during the time period of 1 minute (the first time period) prior to input of the start command, scanning of the on-platen document M is not executed. This can reduce accidental scanning of the on-platen document M when the on-tray document N is inaccurately placed. Therefore, the user is not forced to wait until the undesired scanning is over. Furthermore, waste of resource such as power can be reduced.

<Second Illustrative Aspect>

Next, a second illustrative aspect in accordance with the present invention will be described with reference to FIGS. 11 through 12.

Figure 11:
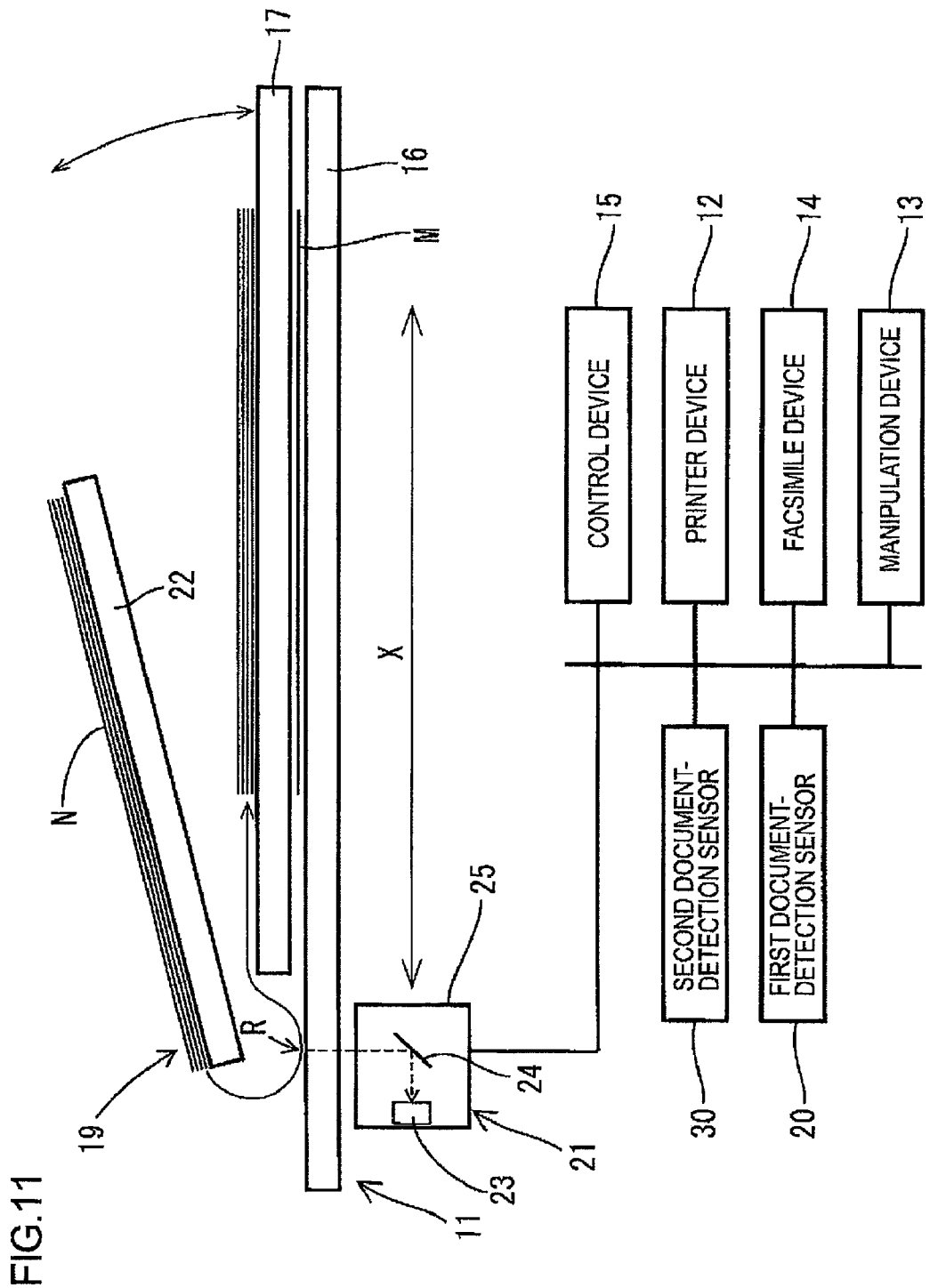
FIG. 11 is a diagrammatic view of the multi-function machine of a second illustrative aspect in accordance with the present invention.

FIG. 11 is a diagrammatic view of a multi-function machine 2 of the second illustrative aspect. The multi-function machine 2 includes a second document-detection sensor 30 (an illustration of a second document-detector) that is disposed below the platen 16.

The second document-detection sensor 30 is, for example, a photoelectronic sensor disposed below the platen 16. The light reflected by either one of the on-platen document M and the document cover 17 enters the document-detection sensor 30. In a case where the document-detection sensor 30 has produced a sensor output that differs from a sensor output produced when the light reflected by the document cover 17 enters the second document-detection sensor 30, the control device 15 determines that document M is placed on the platen 16.

A time period from a time point where the document M is placed on the platen 16 to a time point where the start command to start scanning is inputted is generally shorter and, in many cases, is equal to or less than 1 minute (the illustration of the first time period). That is, if the user is intending to scan the on-platen document M, a detection result of the second document-detection sensor 30 should shift from "no document exists" to "a document exists" during the time period of 1 minute prior to the time point of inputting the start command.

Conversely, if the detection result has not shifted from "no document exists" to "a document exists" during the time period of 1 minute, there is a higher possibility that the user is not intending to scan the on-platen document M but has inaccurately placed the document N on the document tray 22 of the ADF 19.

Therefore, in the second illustrative aspect, in a case where the document N on the document tray 22 of the ADF 19 is not detected, a determination is made as to whether the detection result of the second document-detection sensor 30 has shifted from "no document exists" to "a document exists" during the time period of 1 minute prior to the time point of inputting the start command. In the case where the detection result has not shifted from "no document exists" to "a document exists", it is determined that the user is not intending to scan the on-platen document M, and execution of scanning of the on-platen document M is cancelled.

Figure 12:
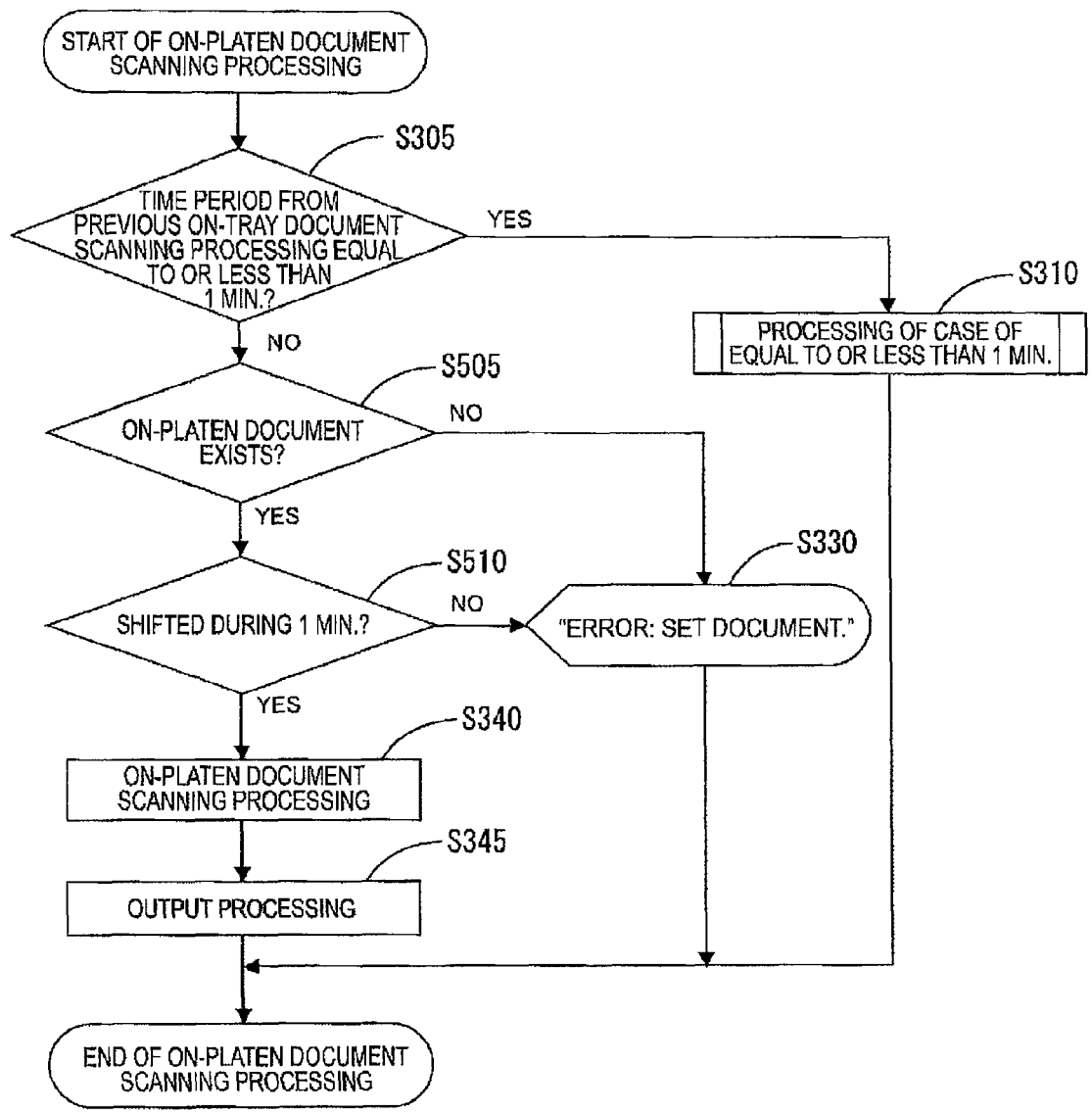
FIG. 12 is a flowchart of the second illustrative aspect in accordance with the present invention.

FIG. 12 is a flowchart showing a process of scanning the on-platen document M performed by the multi-function machine 2. In this illustrative aspect, process steps substantially identical with those of the first illustrative aspect will be designated by the identical reference numerals, while the description will be omitted.

In S505, the control device 15 determines whether the document M is placed on the platen 16 using a detection result of the second document-detection sensor 30. When the document M is placed, the process goes to S510. When the document M is not placed, the process goes to S330.

In S510, the control device 15 determines whether the detection result of the second document-detection sensor 30 has shifted from OFF ("no document exists") to ON ("a document exists") during the time period of 1 minute (the illustration of the first time period) prior to the time point of inputting the start command. When it has not shifted from "no document exists" to "a document exists" during the time period of 1 minute, the process goes to S330. When it has shifted in that manner, the process goes to S340.

Thus, with the multi-function machine 2, in the case where the document N on the document tray 22 of the ADF 19 is not detected while the detection result of the second document-detection sensor 30 has not shifted from "no document exists" to "a document exists" during the time period of 1 minute prior to the time point of inputting the start command, execution of scanning of the on-platen document M is cancelled. Therefore, the multi-function machine 2 serves to reduce accidental scanning of the on-platen document M even if the document N is inaccurately placed on the document tray 22 of the ADF 19.

The other configurations of the multi-function machine 2 is substantially identical with those of the multi-function machine 1 of the first illustrative aspect.

<Third Illustrative Aspect>

Next, a third illustrative aspect in accordance with the present invention will be described with reference to FIG. 13.

When the platen 16 is scanned while no document M is placed thereon, image data representing a blank image is generated. Therefore, the third illustrative aspect is configured as follows: in the case where the document N on the document tray 22 of the ADF 19 is not detected, the control device 15 scans the on-platen document M and generate image data; thereafter, when the generated image data represents a blank image, the control device 15 determines that the on-platen document M has been accidentally scanned, and cancels execution of outputting, such as printing the generated image data or transmitting the generated image data to any external device (not illustrated).

Furthermore, when the document M left on the platen 16 is scanned and image data is generated, the generated image data is similar to the image data generated in the previous scanning of the on-platen document M. Therefore, the third illustrative aspect is configured as follows: while image data generated by scanning the on-platen document M is stored in the RAM for the predetermined time period, the control device 15 scans the on-platen document M and generates another image data; thereafter, in a case where the currently generated image data and the previously generated image data stored in the RAM are similar, the control device 15 determines that the document M left on the platen 16 has been accidentally scanned and cancels printing of the currently generated image data.

Figure 13:
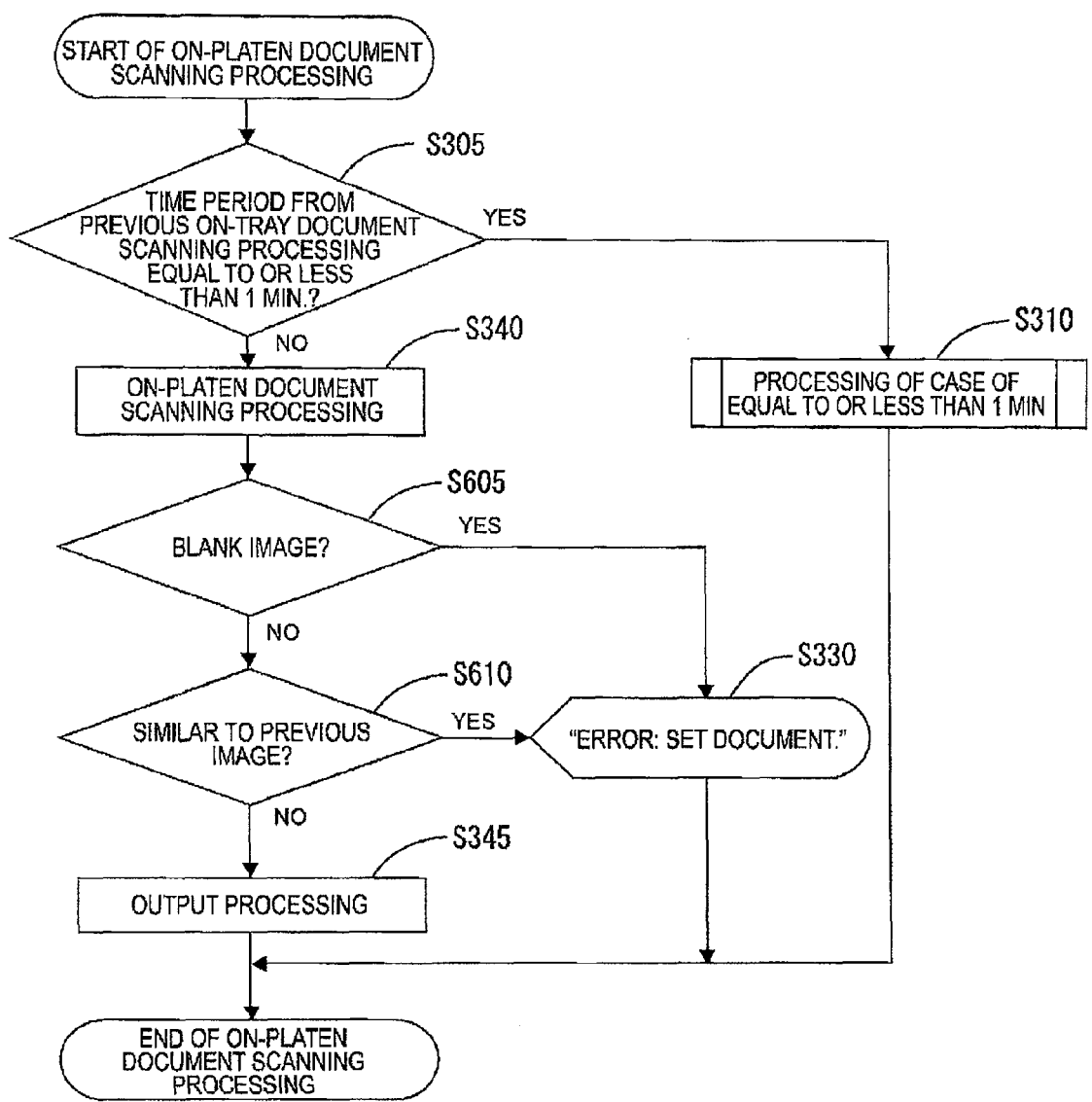
FIG. 13 is a flowchart of a third illustrative aspect in accordance with the present invention.

FIG. 13 is a flowchart showing a process of the multi-function machine of the third illustrative aspect. In this illustrative aspect, process steps substantially identical with those of the first illustrative aspect will be designated by the identical reference numerals, while the description will be omitted.

In S605, the control device 15 determines whether the currently generated image data is a blank image. In a case where it is not a blank image, the process goes to S610. In a case where it is a blank image, the process goes to S330.

The determination of whether the currently generated image data is a blank image may be performed, for example, as follows: in a case where a pixel has 255 levels in value while the pixel value of each pixel of the image data is equal to or greater than 250 in average, the image data is determined to be a blank image.

In S610, the control device 15 determines whether the currently generated image data and the image data stored in the RAM in the previous scanning of the on-platen document M are similar to an extent that they can be determined to have been generated by scanning the identical document M.

A determination of whether the currently generated image data and the previously generated image data are similar is performed, for example, as follows: the control device 15 converts each of color spaces of the currently generated image data and color spaces of the previously generated image data into a uniform color space such as a XYZ color space; then, the control device 15 calculates each color difference $\Delta E$ between each pixel of the presently generated image data and corresponding each pixel of the previously generated image data; if an average of the color differences $\Delta E$ is less than a predetermined threshold value, the control device 15 determines that the currently generated image data and the previously generated image data are similar.

In a case that the currently generated image data and the previously generated image data are similar, the process goes to S345 In a case that they are dissimilar, the process goes to S330.

Thus, with the multi-function machine of the third illustrative aspect, execution of outputting the generated image data is cancelled in the case where the document N is inaccurately placed on the document tray 22 of the ADF 19 and the on-platen document M is accidentally scanned. Therefore, output of the image data generated by the accidental scanning can be prevented.

The other configurations of the multi-function machine of this illustrative aspect are substantially identical with those of the multi-function machine 1 of the first illustrative aspect.

<Fourth Illustrative Aspect>

Figure 15:
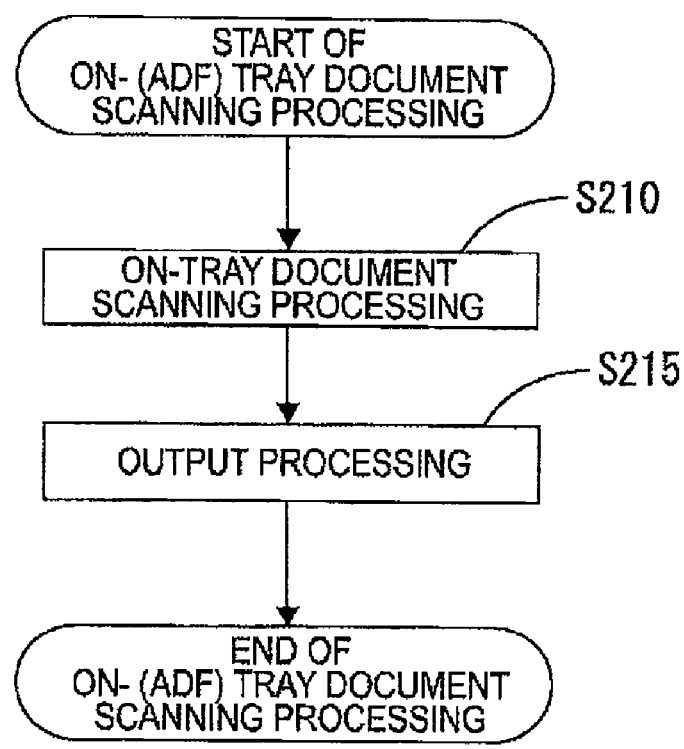
FIG. 15 is another flowchart of the fourth illustrative aspect in accordance with the present invention.
Figure 16:
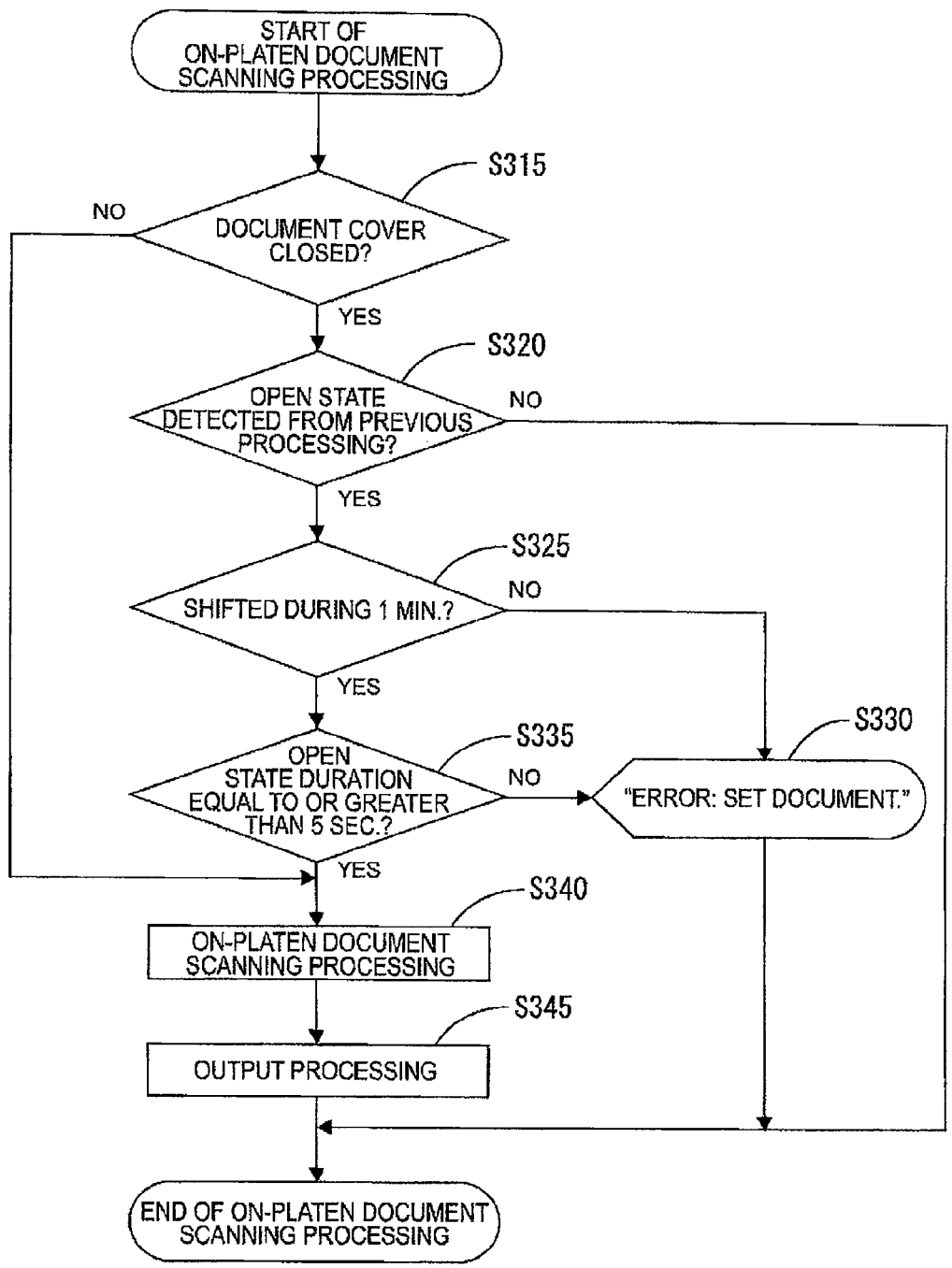
FIG. 16 is another flowchart of the fourth illustrative aspect in accordance with the present invention.

Next, a fourth illustrative aspect in accordance with the present invention will be described with reference to FIGS. 14 through 16.

In the fourth illustrative aspect, in the case where the time period from the previous start command to the present start command is equal to or less than 1 minute (an illustration of a fourth time period), scanning of the document placed on the platen 16 or the document fed from the document tray 22 used for the document scanned in the previous scanning is executed.

Figure 14:
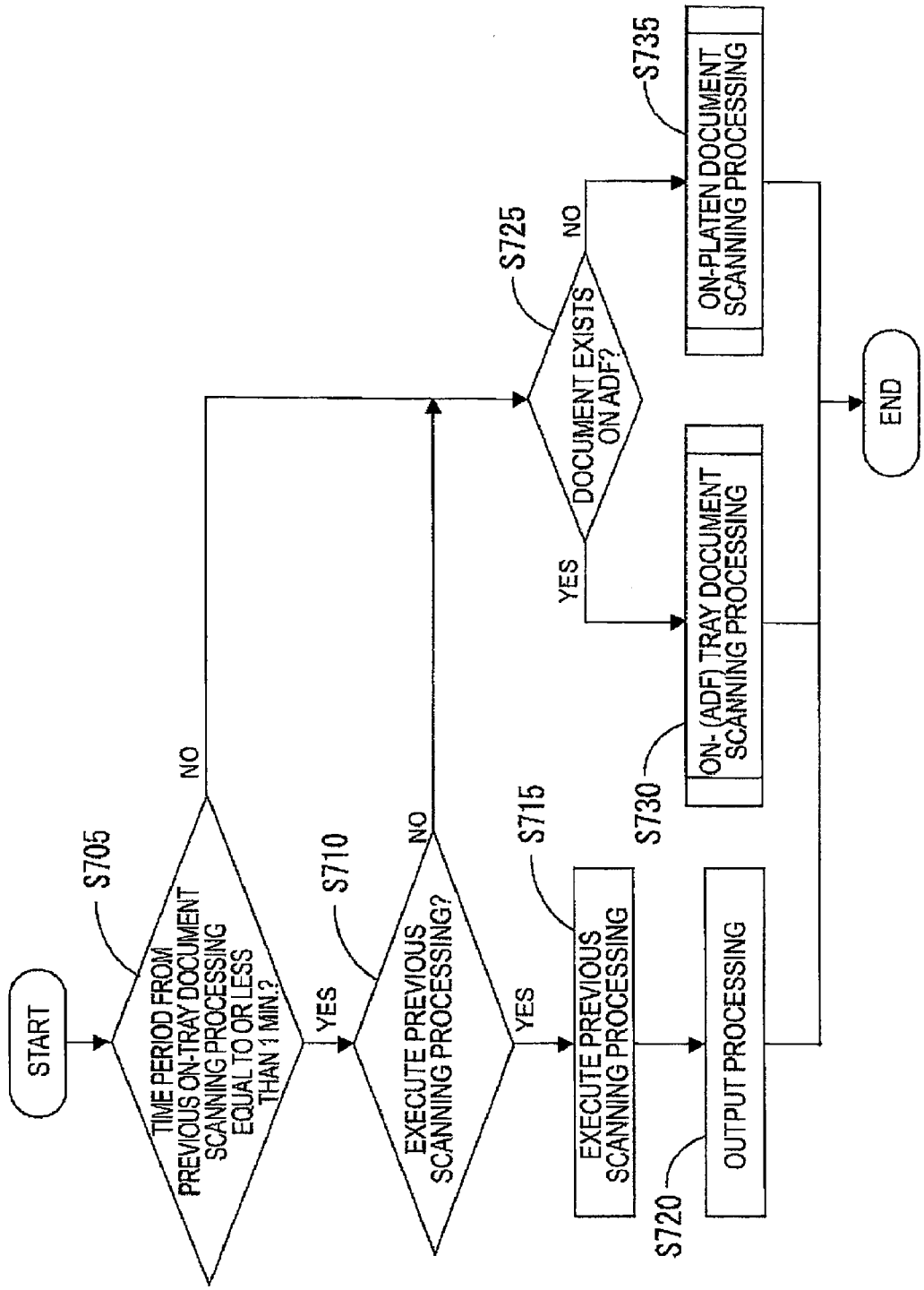
FIG. 14 is a flowchart of a fourth illustrative aspect in accordance with the present invention.

FIG. 14 is a flowchart showing a process of the multi-function machine of the fourth illustrative aspect. When the copy button of the manipulation device 13 is pressed, thereby inputting the start command, this process is started. In this illustrative aspect, process steps substantially identical with those of the first illustrative aspect will be designated by the identical reference numerals, while the description will be omitted.

In S705, the control device 15 determines whether the time period from termination of the previous scanning to a press of the copy button is equal to or less than 1 minute (the illustration of the fourth time period). In the case where the time period is equal to or less than 1 minute, the process goes to S710. In the case where the time period is greater than 1 minute, the process goes to S725.

In S710, the control device 15 asks the user whether to execute scanning of the document placed on the platen 16 or the document fed from the document tray 22 used for the document scanned in the previous scanning. Specifically, for example, the control device 15 indicates a message such as "REPLAY? Press the copy button again." on the display device.

In a case of executing scanning of the document on one of the platen 16 and the document tray 22, the user presses the copy button during a predetermined time period. In a case where the document on one of the platen 16 and the document tray 22 is unnecessary to be scanned, the user waits for the predetermined time period without pressing the copy button.

In the case where the copy button is pressed during the predetermined time period, the process goes to S715. In the case where the copy button is not pressed during the predetermined time period, the process goes to S725.

In S715, the control device 15 executes scanning of the document placed on the platen 16 or the document fed from the document tray 22 used for the document scanned in the previous scanning. For example, in a case where the on-platen document M is scanned in the previous scanning processing, the control device 15 executes scanning of the on-platen document M.

In S720, the control device 15 prints the image data generated in S715.

In S725, the control device 15 determines the state of the output signal of the first document-detection sensor 20. Then, when the output signal is ON (a document exists), it is determined that a document N exists, and the process goes to scanning of the on-tray document N of the ADF 19 (S730). On the other hand, when the output signal is OFF (no document exists), it is determined that no document N exists, and the process goes to scanning of the on-platen document M (S735).

The scanning the on-tray document N of the ADF 19 (S730) and the scanning the on-platen document M (S735) are different from the "scanning of the on-tray document N of the ADF 19 (S110)" and the "scanning of the on-platen document M (S115)", respectively, of the first illustrative aspect only in that they exclude the processing of determining whether the time period from the previous scanning is equal to or less than 1 minutes. Other configurations are substantially identical with those of the first illustrative aspect. Therefore, in this illustrative aspect, only flowcharts (FIGS. 15 and 16) are shown, while the detailed descriptions are omitted.

Thus, in the case where the time period from the previous start command to the present start command is equal to or less than 1 minute, the multi-function machine of the fourth illustrative aspect executes scanning of the document placed on the platen 16 or the document fed from the document tray 22 used for the document scanned in the previous scanning. Therefore, the multi-function machine can repeat execution of re-scanning even in a case where the document cover 17 is continuously in the closed state from termination of the previous scanning to the present start command, which, in the first illustrative aspect, would fall under the conditions wherein execution of scanning would be cancelled.

Furthermore, in the case where the time period from termination of the previous scanning to the present start command is equal to or less than 1 minute, the user of the multi-function machine of the fourth illustrative aspect can select whether to execute the process of scanning the document on one of the platen 16 and the document tray 22. Therefore, in the case that the user desires to scan the document placed on the other one of the platen 16 and the document tray 22, the user can avoid causing the document on one of the platen 16 and the document tray 22 to be scanned by selecting to cancel execution of scanning of one of the platen 16 and the document tray 22.

<Other Illustrative Aspect>

The present invention is not limited to the illustrative aspects described as above with reference to the drawings; for example, illustrative aspects as follows are also included within the scope of the present invention.

(1) In the above first illustrative aspect, in the case where the present document cover 17 is in the open state, it is determined that the document has a greater thickness (such as a book), and scanning is executed. However, some image scanning apparatuses are unavailable for such a document having greater thickness. Because the document cover 17 has to be kept in the closed state when scanning a document placed on the platen 16 in this case, it may be configured to determine, in the case where the document cover is in the open state, that the user is not intending to scan the document placed on the platen 16 and cancel execution of scanning of the document on the platen 16.

(2) In the above illustrative aspects 1 through 4, each of the first, third, and fourth time periods is illustrated to be 1 minute, and the second time period is illustrated to be 5 seconds. These time periods are not so limited, and can be any time period.

(3) The above illustrative aspects are described with illustrating the case where the image data generated by scanning the document is outputted by printing. The generated image data may be outputted by faxing using the facsimile device 14 or by loading in an external storage device such as a USB memory (not illustrated) connected to the multi-function machine. In this case, the multi-function machine serves to reduce the event of faxing, or loading in the external storage device, the image data generated accidentally from a document placed on the platen 16 when a document is inaccurately placed on the document tray 22 of the ADF 19.

(4) The third illustrative aspect may be applied to the first illustrative aspect or to the second illustrative aspect. If the third illustrative aspect is applied to the first illustrative aspect or to the second illustrative aspect, the first illustrative aspect (or the second illustrative aspect) serves to reduce accidental scanning of the document M placed on the platen 16 when the document N is inaccurately placed on the document tray 22 of the ADF 19 while, further, even in an event where the on-platen document M is accidentally scanned, the third illustrative aspect serves to reduce output of the image data generated by the accidental scanning.

The invention claimed is:

1. An image scanning apparatus comprising:
a platen configured to support a document placed thereon;
a document cover configured to shift between an open state to open the platen and a closed state to close the platen, the document cover including a document feeder having a document tray, wherein the document tray is configured to support a document placed thereon, and the document feeder is configured to feed the document placed on the document tray to a scanning position;
an open-close detector configured to detect a state of the document cover;
a document-detector configured to detect the document on the document tray;
a scanning unit configured to selectively perform a first scanning relative to the document tray and a second scanning relative to the platen, and to generate image data;
a commanding unit configured to receive input corresponding to a start command to start scanning; and
a control unit including a time counter configured to count a time period between a time when a shift in the state of the document cover from the open state to the closed state is detected by the open-close detector and a time when input corresponding to the start command is received by the commanding unit, the control unit being configured to:
control the document feeder to feed the document on the document tray when the document on the document tray is detected by the document-detector, and control the scanning unit to perform the first scanning,
determine whether the time period counted by the time counter is longer than a first reference time period,
control the scanning unit to perform the second scanning when the document on the document tray is not detected by the document detector and the time is shorter than the first reference time period, and
control the scanning unit to cancel execution of the second scanning when the document on the document tray is not detected by the document detector and the time is longer than the first reference time period.

2. The image scanning apparatus according to claim 1, wherein, when the document cover shifts from the open state to the closed state during the first reference time period prior to receiving the input corresponding to the start command, and a duration time period of the open state is less than a second reference time period, the control unit cancels execution of scanning of the document placed on the platen.

3. An image scanning apparatus comprising:
a platen configured to support a document placed thereon;
a document cover configured to shift between an open state to open the platen and a closed state to close the platen, the document cover including a document feeder having a document tray, wherein the document tray is configured to support a document placed thereon, and the document feeder is configured to feed the document placed on the document tray to a scanning position;
an open-close detector configured to detect a state of the document cover;
a document-detector configured to detect the document on the document tray;
a scanning unit configured to selectively perform a first scanning relative to the document tray and a second scanning relative to the platen, and to generate image data;
a commanding unit configured to receive input corresponding to a start command to start scanning; and
a control unit including a time counter configured to count a time period between a time when a first start command is input through the commanding unit and a time when a second start command following the first start command is input through the commanding unit, the control unit being configured to:
control the document feeder to feed the document on the document tray when the document on the document tray is detected by the document-detector, and control the scanning unit to perform the first scanning;
determine whether the document cover is maintained in the closed state for the time period counted by the time counter;
control the scanning unit to perform the second scanning when the document on the document tray is not detected by the document detector when the shift in the state of the document cover from the open state to the closed state is detected by the open-close detector for the time period; and
control the scanning unit to cancel execution of the second scanning when the document on the document tray is not detected by the document detector and the document cover is maintained in the closed state.

4. An image scanning apparatus comprising:
a platen configured to support a document placed thereon;
a document cover configured to shift between an open state to open the platen and a closed state to close the platen, the document cover including a document feeder having a document tray, wherein the document tray is configured to support a document placed thereon, and the document feeder is configured to feed the document placed on the document tray to a scanning position;
an open-close detector configured to detect a state of the document cover;
a document-detector configured to detect the document on the document tray;
a scanning unit configured to selectively scan the document placed on the platen and the document at the scanning position fed from the document tray and to generate image data;
a control unit configured to control at least one of the document feeder and the scanning unit and configured to control the scanning unit to selectively scan the document placed on the platen and the document fed from the document tray;
a commanding unit configured to receive input corresponding to a start command to start scanning;
a storing unit configured to store the image data generated by the scanning unit; and
an output unit configured to output the image data generated by the scanning unit,
wherein, when the input corresponding to the start command is received, the control unit is configured to:
control the scanning unit to scan the document fed from the document tray when the document placed on the document tray is detected by the document-detector;
determine whether to control the scanning unit to scan the document placed on the platen when the document placed on the document tray is not detected by the document-detector, wherein the determination is performed based on a result of detection performed by the open-close detector;
  determine whether a time period from termination of a previous scanning to receipt of the input corresponding to the start command is equal to or less than a specified time period; and
  when the time period is equal or less than the specified time period, the control unit cancels execution of scanning and outputs the image data stored in the storing unit using the output unit.

5. The image scanning apparatus according to claim 4 further comprising a selecting unit for selecting whether to output the image data stored in the storing unit.

6. The image scanning apparatus according to claim 4, wherein the storing unit deletes the image data after at least the specified time period.

7. An image scanning apparatus comprising:
  a platen configured to support a document placed thereon;
  a document cover configured to shift between an open state to open the platen and a closed state to close the platen, the document cover including a document feeder having a document tray, wherein the document tray is configured to support a document placed thereon, and the document feeder is configured to feed the document placed on the document tray to a scanning position;
  an open-close detector configured to detect a state of the document cover;
  a document-detector configured to detect the document on the document tray;
  a scanning unit configured to selectively scan the document placed on the platen and the document at the scanning position fed from the document tray and to generate image data;
  a control unit configured to control at least one of the document feeder and the scanning unit and configured to control the scanning unit to selectively scan the document placed on the platen and the document fed from the document tray;
  a commanding unit configured to receive input corresponding to a start command to start scanning;
  wherein, when the input corresponding to the start command is received, the control unit is configured to:
    control the scanning unit to scan the document fed from the document tray when the document placed on the document tray is detected by the document-detector; and
    determine whether to control the scanning unit to scan the document placed on the platen when the document placed on the document tray is not detected by the document-detector, wherein the determination is performed based on a result of detection performed by the open-close detector, and
  wherein, when the input corresponding to the start command is received and a time period from termination of a previous scanning to receipt of the input corresponding to the start command is equal to or less than a specified time period, the control unit controls the scanning unit to scan the document placed on the platen or the document fed from the document tray used for the document scanned in the previous scanning.

8. The image scanning apparatus according to claim 7 further comprising a selecting unit configured to select whether to control the scanning unit to scan the document placed on the platen or the document at the scanning position fed from the document tray when the time period from termination of the previous scanning to the receipt of the input corresponding to the start command is equal to or less than the specified time period.

9. An image scanning apparatus comprising:
  a platen configured to support a document placed thereon;
  a document cover configured to shift between an open state to open the platen and a closed state to close the platen, the document cover including a document feeder having a document tray, wherein the document tray is configured to support a document placed thereon, and the document feeder is configured to feed the document placed on the document tray to a scanning position;
  a first document-detector configured to detect the document placed on the document tray;
  a second document-detector configured to detect the document placed on the platen;
  a scanning unit configured to selectively scan the document placed on the platen and the document at the scanning position fed from the document tray and to generate image data;
  a control unit configured to control at least one of the document feeder and the scanning unit and configured to control the scanning unit to selectively scan the document placed on the platen and the document fed from the document tray; and
  a commanding unit configured to receive input corresponding to a start command to start scanning,
  wherein:
  when the input corresponding to the start command is received:
    (a) when the document placed on the document tray is detected by the first document-detector, the control unit controls the scanning unit to scan the document fed from the document tray, and
    (b) when the document placed on the document tray is not detected by the first document-detector, the control unit determines whether a result of detection performed by the second document-detector has shifted from a document-undetected state to a document-detected state during a specific time period prior to receipt of the input corresponding to the start command, and
    (b1) when the result of the detection has shifted, the control unit controls the scanning unit to scan the document placed on the platen, and
    (b2) when the result of the detection has not shifted, the control unit cancels execution of scanning of the document placed on the platen.

10. An image scanning apparatus comprising:
  a platen configured to support a document placed thereon;
  a document cover configured to shift between an open state to open the platen and a closed state to close the platen, the document cover including a document feeder having a document tray, wherein the document tray is configured to support a document placed thereon, and the document feeder is configured to feed the document placed on the document tray to a scanning position;
  a document-detector configured to detect the document on the document tray;
  a scanning unit configured to selectively scan the document placed on the platen and the document at the scanning position fed from the document tray and to generate image data;
  an output unit configured to output the image data generated by the scanning unit;
  a control unit configured to control at least one of the document feeder and the scanning unit and configured to control the scanning unit to selectively scan the document placed on the platen and the document fed from the document tray; and a commanding unit configured to receive input corresponding to a start command to start scanning, wherein:

when the input corresponding to the start command is received,
- (a) when the document placed on the document tray is detected by the document-detector, the control unit controls the scanning unit to scan the document fed from the document tray and to output image data of the document using the output unit, and
- (b) when the document placed on the document tray is not detected by the document-detector, the control unit controls the scanning unit to scan the document placed on the platen and to generate image data of the document placed on the platen, and
    - (b1) when the image data of the document placed on the platen is not a blank image, the control unit controls the output unit to output the image data, and
    - (b2) when the image data is a blank image, the control unit cancels execution of outputting of the image data.

11. An image scanning apparatus comprising:

a platen configured to support a document placed thereon;

a document cover configured to shift between an open state to open the platen and a closed state to close the platen, the document cover including a document feeder having a document tray, wherein the document tray is configured to support a document placed thereon, and the document feeder is configured to feed the document placed on the document tray to a scanning position;

a document-detector configured to detect the document placed on the document tray;

a scanning unit configured to selectively scan the document placed on the platen and the document at the scanning position fed from the document tray and to generate image data;

a storing unit configured to store the image data generated by the scanning unit;

an output unit configured to output the image data generated by the scanning unit;

a control unit configured to control at least one of the document feeder and the scanning unit and configured to control the scanning unit to selectively scan the document placed on the platen and the document fed from the document tray; and a commanding unit configured to receive input corresponding to a start command to start scanning;

wherein:

when the input corresponding to the start command is received,
- (a) when the document placed on the document tray is detected by the document-detector, the control unit controls the scanning unit to scan the document fed from the document tray and outputs the image data using the output unit, and
- (b) when the document placed on the document tray is not detected by the document-detector, the control unit controls the scanning unit to scan the document placed on the platen and to generate first image data, and
    - (b1) when the first image data is dissimilar to second image data generated by a previous scanning of the document placed on the platen and stored in the storing unit, the control unit controls the output unit to output the first image data, and
    - (b2) when the first image data is similar to the second image data, the control unit cancels execution of outputting the first image data.

* * * * *